(No Model.)
E. HERRINGTON.
CORN SHELLER.
No. 380,389. Patented Apr. 3, 1888.
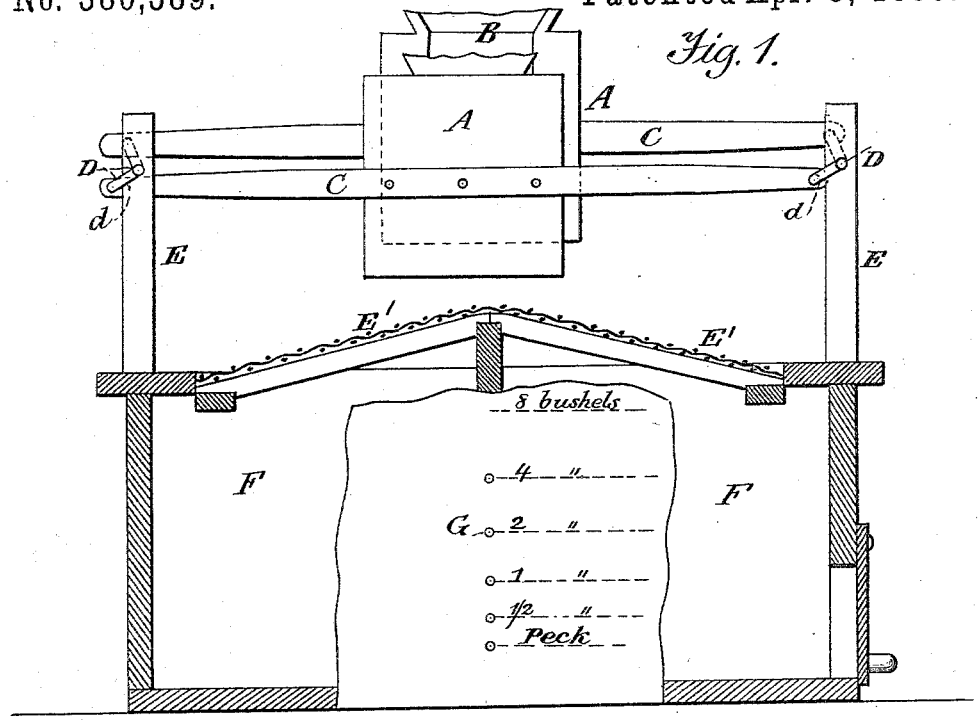
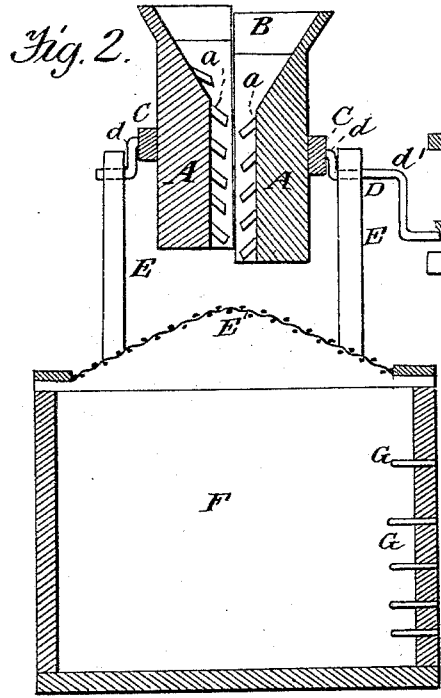
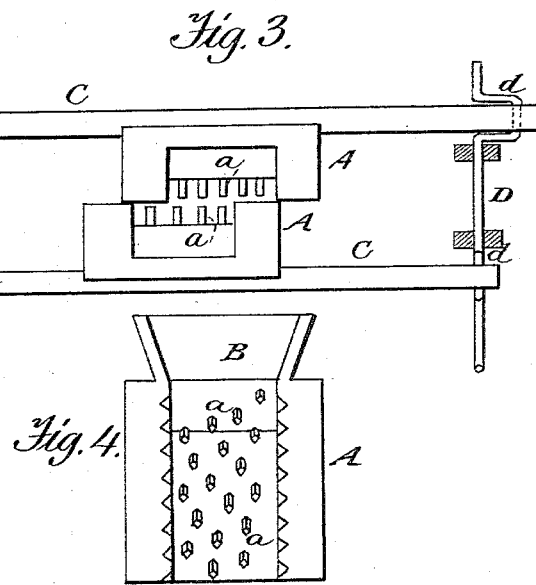
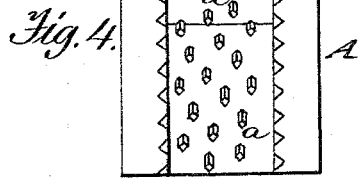
Witnesses.
A. Rupkert.
Thomas P. Simpson
Inventor:
Ephraim Herrington

UNITED STATES PATENT OFFICE.

EPHRAIM HERRINGTON, OF MOUNT VERNON, ASSIGNOR OF ONE-HALF TO M. M. BUSH, OF TOWNS, GEORGIA.

CORN-SHELLER.

SPECIFICATION forming part of Letters Patent No. 380,389, dated April 3, 1888.

Application filed September 14, 1887. Serial No. 249,699. (No model.)

*To all whom it may concern:*

Be it known that I, EPHRAIM HERRINGTON, a citizen of the United States, residing at Mount Vernon, in the county of Montgomery and State of Georgia, have invented certain new and useful Improvements in Corn-Shellers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make a corn-sheller which will automatically agitate the ears in a hopper and feed them successively to the teeth of the sheller.

Figure 1 of the drawings is a side elevation, with the receptacle for the shelled corn in longitudinal section; Fig. 2, a transverse sectional elevation; Fig. 3, a plan view of the grinding mechanism; and Fig. 4, an inside elevation of one of the sections of the sheller.

In the drawings, A A represent the two sections of the sheller, each provided with the downwardly-inclined teeth $a$, which extend up into the lower part of the hopper B. A sufficient space or width is left between the teeth on the opposite sections for the easy downward passage of the cob after the corn has been rubbed off by the teeth. Each section A is attached to a similar and parallel bar, C, and the two bars are connected near their ends by a double-crank shaft, D, the ends of bars being each carried by a crank, $d$. The shafts D have their bearings in the upper part of standards E, and may be turned by a handcrank, $d'$, or by any other power.

After a quantity of corn on the cob has been poured into the hopper and the crank-shafts been made to rotate, the sections or jaws A A are given a rotary reciprocating motion, which effectually rubs the corn from the cob and allows it to descend with the cob through the sheller upon a sieve, E'. This sieve is inclined from the middle down on each side, so as to allow the cobs to pass off at each side, while the corn passes through the sieve into the chest or receptacle F, which is provided with the inside pointers, G. In the same horizontal plane with each of the pointers, and on the outside of the chest, are arranged notations to indicate the quantity of grain up to any pointer.

Having thus described all that is necessary to a full understanding of my invention, what I claim as new and of my invention is—

The described device for shelling corn, made in two parts, each part containing a half-hopper and a half-sheller section, each shellersection having corresponding opposite sets of downwardly-inclined teeth, and each part supported on one of two parallel bars, C C, pivoted to the cranks of two opposite shafts, as shown, and for the purpose set forth.

In testimony whereof I affix my signature in presence of two witnesses.

EPHRAIM HERRINGTON.

Witnesses:
A. RUPPERT,
THOMAS P. SIMPSON.